March 28, 1944.　　　　P. P. ELKA　　　　2,345,246
EXPANSIBLE MANDREL
Filed Feb. 11, 1943
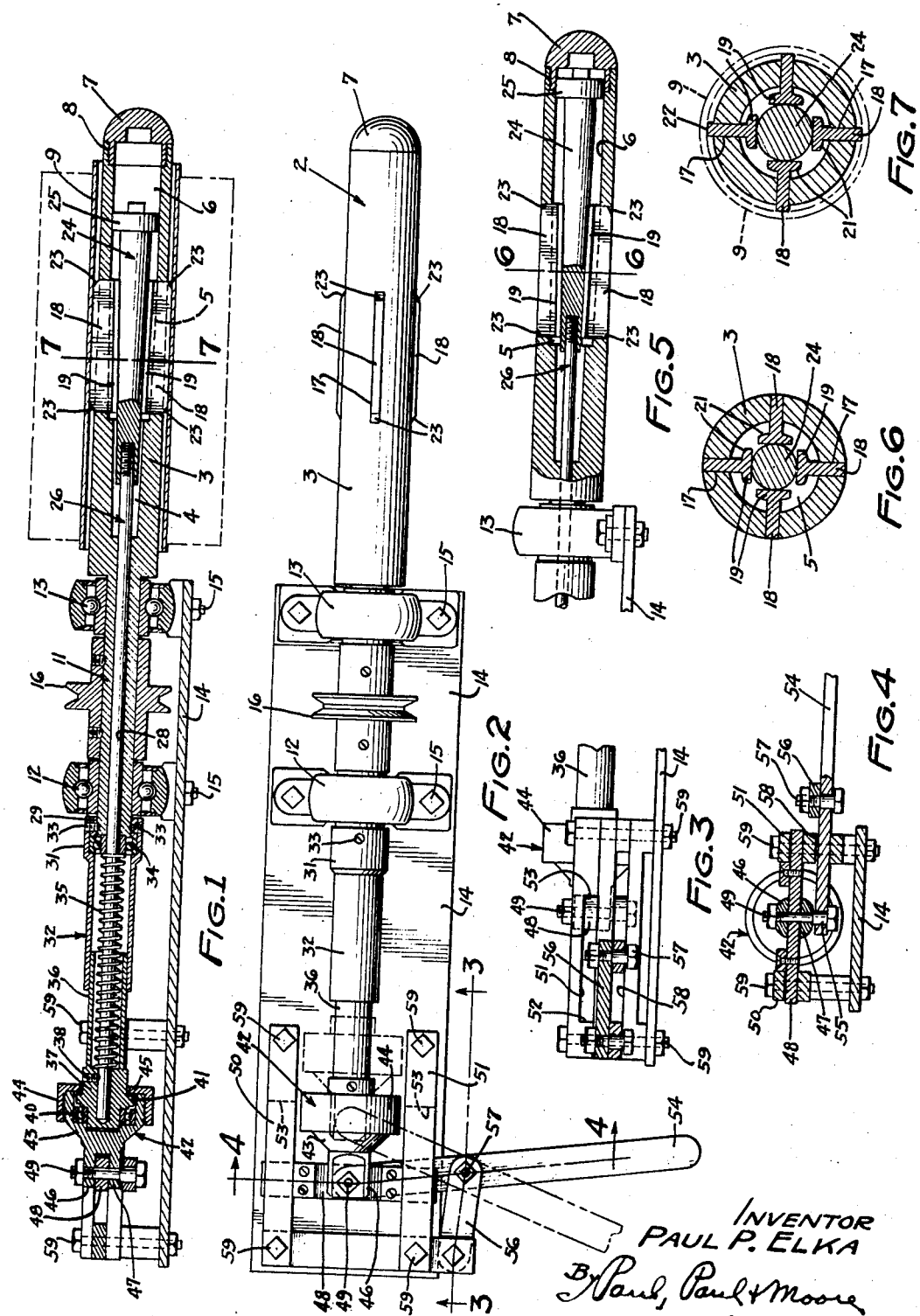
INVENTOR
PAUL P. ELKA Patented Mar. 28, 1944

2,345,246

UNITED STATES PATENT OFFICE 2,345,246

EXPANSIBLE MANDREL

Paul P. Elka, Minneapolis, Minn.

Application February 11, 1943, Serial No. 475,580

3 Claims. (Cl. 242—72)

This invention relates to new and useful improvements in expansible mandrels, and more particularly to a novel jaw operating mechanism for such mandrels.

An object of the invention is to provide an expansible mandrel which may be used for supporting various articles as, for example, the hollow cores upon which various kinds of sheet material may be wound, such as wax paper, paper hand towels, and various other items which are usually wound upon a hollow core or spool.

A further object is to provide an expansible mandrel rotatably supported at one end in suitable bearings and having its opposite end unsupported, whereby a core or other tubular member may readily and quickly be slid onto the mandrel from the unsupported end thereof.

A further object is to provide an expansible mandrel having a reduced end portion received in suitable bearings secured to a supporting member or plate, and said mandrel comprising an elongated cylindrical body having a tapered bore therein, the wall of which is provided with a plurality of spaced elongated openings or slots each supporting a work-engaging jaw, and an actuating rod being mounted within said bore and engageable with the inner faces of the jaws, whereby when the rod is moved in one direction, the jaws will be moved outwardly into engagement with the work positioned on the mandrel, and when the rod is moved in the opposite direction the jaws are retracted to release the work.

A further object is to provide a mandrel of the character disclosed, having a reduced extension at one end received in suitable bearings, and said mandrel having a plurality of work-engaging jaws mounted therein and adapted to be operated by an actuating rod mounted for axial movement in a bore provided within the mandrel, and a tubular member being secured to the bearing end of the mandrel for direct rotation therewith, and an axially movable tubular member having one end telescoping with said first mentioned tubular member and having its opposite end secured to the adjacent end of the actuating rod, and a non-rotatable casing rotatably supporting the head of said axially movable tubular member, said casing having means for axially moving it with respect to the mandrel whereby the actuating rod within the mandrel will outwardly move the jaws into engagement with the work when the head is moved in one direction, and when moved in the opposite direction, said jaws are retracted to release the work from the mandrel.

Other objects of the invention reside in the simple and inexpensive construction of the mandrel and the work-engaging jaws thereof; in the novel means provided for expanding or outwardly moving the jaws into engagement with the work; in the means provided for operating the actuating rod for expanding the jaws, including the non-rotatable casing and the means provided for axially translating said casing to operate the actuating rod; in the construction and arrangement of the operating lever for controlling the expansion and contraction of the jaws of the mandrel; and in the provision of a simple and inexpensive mandrel provided with suitable anti-friction bearings mounted on a suitable supporting plate or base upon which the operating means for the mandrel jaws are also mounted, and whereby the mandrel and its operating means may be assembled as a unitary structure which may readily be mounted as a unit upon a work bench or other suitable supporting means.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown, as various changes may be made within the scope of the claims which follow.

In the drawing:

Figure 1 is a longitudinal sectional view showing the construction of the mandrel with the jaws expanded to support a tubular core;

Figure 2 is a plan view of Figure 1;

Figure 3 is a detail sectional view on the line 3—3 of Figure 2, showing the guides for supporting the crosshead and the operating lever;

Figure 4 is a detail cross-sectional view on the line 4—4 of Figure 2, showing the guides for the crosshead and also showing the supporting means for the operating lever;

Figure 5 is a detail sectional view showing the jaws retracted;

Figure 6 is an enlarged cross-sectional view on the line 6—6 of Figure 5, showing the jaws retracted; and Figure 7 is a similar cross-sectional view on the line 7—7 of Figure 1, showing the jaws expanded.

The novel mandrel herein disclosed is generally designated by the numeral 2, and comprises a cylindrical body 3 having a bore 4 therein, one end of which is connected with a tapered bore 5 provided in the intermediate portion of the body 3 of the mandrel, as best illustrated in Figure 1. A cylindrical bore 6 is provided at the opposite end of the mandrel whose inner end communicates with the tapered bore 5. A suitable cap 7 is shown received in threaded engagement with the outer end of the mandrel 2, as indicated at 8 in Figure 1. The cap 7 serves as a closure for the bore 6 and to provide a smoothly finished end for the mandrel, whereby the operator's clothing is not likely to become caught on the mandrel, and also whereby the operation of sliding a hollow core 9 over the mandrel is greatly facilitated, as will readily be understood by reference to Figure 1.

The body 3 of the mandrel 2 is shown provided at one end with a reduced cylindrical extension 11 received in suitable anti-friction bearings 12 and 13, shown secured to a suitable base plate 14 by such means as screws or bolts 15. Other types of bearings applicable for the purpose may be utilized in lieu of the anti-friction bearings shown in the drawings. To drive the mandrel 2 a suitable pulley or shaft 16 is secured to the reduced extension 11 of the mandrel, and is preferably mounted between the bearings 12 and 13, whereby the ends of the hubs of the pulley serve to prevent axial movement of the extension 11 in the bearings. In some instances, it may be found desirable to utilize a single bearing for supporting the mandrel 2 in lieu of the bearings 12 and 13, it being understood, however, that when a single bearing is thus used, it must be of such length as to provide an adequate support for the mandrel.

An important feature of the present invention resides in the means provided for securing the work to the mandrel 2. As best shown in Figures 1, 5, 6 and 7, the body 3 of the mandrel has plurality of elongated openings or slots 17 therein disposed lengthwise of the mandrel, and uniformly spaced apart around the circumference thereof, as best shown in Figures 6 and 7.

Suitable work-engaging jaws 18 are mounted in the slots 17, and each is shown having a T-shaped head 19 positioned within the tapered bore 5, as shown. The T-shaped heads provide abutment shoulders 21 adapted to engage the wall of the bore 5 to limit outward radial movement of the jaws 18, as will readily be understood by reference to Figures 6 and 7. The T-shaped heads 19 and abutment shoulders 21 of the jaws 18 are disposed at a slight angle to the work-engaging edges 22 of the jaws. This angle corresponds to the taper of the bore 5, whereby when the abutments 21 engage the wall of the bore 5, the work-engaging edges 22 of the jaws will be substantially parallel to the axis of the mandrel, as shown in Figure 2. The outer end corners of the jaws are preferably beveled off, as indicated at 23 in Figures 1 and 5, to prevent such corners from engaging the surface of the core 9, when slipping the core onto or off the mandrel.

Another important feature of the invention resides in the means provided for actuating the jaws 18 to expand or contract the mandrel. Such means is shown comprising an actuating rod or member, generally designated by the numeral 26, having an enlarged portion 24 which is tapered to correspond to the taper of the bore 5. The enlarged portion 24 has a head 25 at one end slidable in the cylindrical bore 6, to support the tapered portion 24 on axial alignment with the mandrel. To facilitate manufacture, the actuating rod is preferably screw threaded into the adjacent end of the enlarged tapered portion 24, as shown in Figures 1 and 5. The rod 26 is slidably supported in a bore 28 provided in the reduced extension 11 of the mandrel, as clearly illustrated in Figure 1.

Another important feature of the invention resides in the construction of the means provided for axially translating the rod 26 in the mandrel to control the operation of the jaws 18.

As shown in Figure 1, a collar 29 is fitted onto the adjacent end portion of the reduced extension 11 of the mandrel. Fitted onto this collar is the enlarged cylindrical end portion 31 of a tubular member 32 whose opposite end is open, as will be understood by reference to Figure 1. Suitable set screws 33 secure the tubular member 32 and collar 29 to the extension 11 of the mandrel. To reduce friction to a minimum, an anti-friction bearing 34 is preferably provided within the enlarged end portion 31 of the tubular member 32 for supporting the rod 26 and to take up the thrust of a suitable compression spring 35, coiled about the rod 26.

Telescoped within the tubular member 32 is a relatively smaller tubular member 36 which, in the present instance, is shown integrally formed with a head 37 bored to receive the end of the actuating rod 26 and secured to said rod by such means as a set screw 38. In some instances it may be deemed more desirable to construct the tubular member 36 independently of the head 37 and then suitably securing it thereto. The outer end of the spring 35 seats against the head 37 whereby the spring constantly urges the actuating rod 26 in a direction to move the tapered member 24 into expanding engagement with the jaws 18.

In some instances, particularly in relatively longer mandrels the spring 35 may be dispensed with and in lieu thereof a relatively shorter spring may be interposed between the head 25 of the actuating rod 26 and the cap 7. In some installations it may be found desirable to dispense with the spring entirely, in which case the actuating rod is positively operated in both directions by manipulation of the control lever 54.

To longitudinally translate the rod 26 within the mandrel, the head 37, which has an annular flange 41, is fitted within a suitable casing or housing, generally designated by the numeral 42. This housing is shown comprising two parts 43 and 44. The part 44 is in the form of a cap, and has an inwardly directed annular flange 45 adapted to engage the flange 41 of the head 37, thereby to retain said head within the casing 42. A suitable anti-friction bearing 40 is preferably provided within the casing 42 to rotatably support the head 37 therein.

The casing 42 is shown provided with spaced lugs 46 and 47 adapted to receive a crosshead 48, shown secured in place between the lugs 46 and 47 of the casing 42 by a shouldered bolt 49, best shown in Figure 4. The terminals of the crosshead 48 are slidable in suitable guides 50 and 51, which permit free axial movement of the casing 42, but prevent the casing from relatively rotating. Suitable limit stops 52 and 53 are provided for limiting movement of the crosshead 48 in the guides 50 and 51.

An operating lever 54 has one end pivotally connected to the shouldered bolt 49, as shown at 55 in Figure 4. The intermediate portion of the lever is connected to one end of a link 56 by a suitable bolt or pivot pin 57, as best shown in Figures 2 and 4. The operating lever 54, as clearly illustrated in Figures 3 and 4, is guidingly supported in a suitable guide slot 58.

As a result of the crosshead 48 and the manner in which it is guidingly supported in the guides 50 and 51, and also as a result of the lever being guidingly supported in the slot 58, the actuating rod 26 may readily and conveniently be operated without effort, as the unique mounting of the actuating rod operating mechanism positively prevents lateral strains being exerted on the actuating rod, as will readily be understood.

The guides 50, 51 and 58 are shown fixedly secured to the supporting base 14 by such means as bolts 59, whereby the entire apparatus may be assembled as a unitary structure, which may readily be secured to a work bench or table of conventional design.

The novel apparatus herein disclosed has been found extremely practical and efficient for winding various types of web material, such as wax paper, onto a hollow core. The mandrel may also be used for supporting other articles, such as spools, to facilitate winding wire or cords or other such materials thereon. Because of the mandrel 2 being supported at one end only, as shown in Figures 1 and 2, it may be utilized for a great many purposes, as will readily be understood. In some instances, however, it may be desired to support both ends of the mandrel, particularly if it becomes necessary to relatively elongate the mandrel for certain classes of work.

It is also to be understood that while I have herein shown the mandrel as comprising four jaws spaced equidistantly part around the circumference of the mandrel, any number of jaws may be used without departing from the scope of the invention. The particular construction of the guide means for the crosshead 48 and lever 54 may also be varied in numerous ways without departing from the scope of the invention.

In Figure 1, the apparatus is so constructed that the spring 35 constantly operates to move the actuating rod in a direction to expand the jaws 13. If desired, the spring 35 may be otherwise arranged, whereby that its action upon the actuating rod 26 may be reversed, whereon the jaws are positively moved into engagement with the core 9 by manipulation of the operating lever 54.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an apparatus of the class described, a supporting member, bearing means on said member, a mandrel supported at one end in said bearing means, whereby a hollow core may be fitted onto the mandrel, an axial bore in the mandrel, a plurality of guide openings in the wall of the mandrel, a plurality of jaws mounted in said guide openings, an actuating rod mounted in said bore and having means thereon adapted to engage said jaws to move them outwardly into engagement with a piece of work positioned on the mandrel, when the rod is moved in one direction, telescoping members, one connected to the bearing-supported end of the mandrel and the other to the adjacent end of the actuating rod, said latter telescoping member being axially movable with respect to the mandrel, a crosshead operatively connected to the axially movable telescoping member, spaced guides for receiving the ends of the crosshead, and a pivoted operating lever having one end pivotally connected to the crosshead, whereby when the operating lever is oscillated, the axially movable telescoping member is operated to axially move the actuating rod within the mandrel, thereby to expand or contract the jaws.

2. In an apparatus of the class described, a supporting member, bearing means on said member, a mandrel supported at one end in said bearing means whereby a hollow core may be fitted onto the mandrel, an axial bore in the mandrel, a plurality of elongated guide openings in the wall of the mandrel, a plurality of jaws mounted in said guide openings, an actuating rod mounted in said bore and having a tapered portion adapted to engage said jaws to move them outwardly into engagement with a piece of work positioned on the mandrel, when the rod is moved in one direction, telescoping members, one connected to the bearing-supported end of the mandrel and the other to the adjacent end of the actuating rod, said latter telescoping member being axially movable with respect to the mandrel, a crosshead operatively connected to the axially movable telescoping member, spaced guides for receiving the ends of the crosshead, a pivoted operating lever having one end pivotally connected to the crosshead, whereby when the actuating lever is oscillated, the axially movable telescoping member is operated to axially move the actuating rod within the mandrel, thereby to expand or contract the jaws, guide means for the operating handle, and spring means for constantly urging the operating handle in a direction to expand the mandrel jaws.

3. In an apparatus of the class described, a supporting member, bearing means on said member, a mandrel supported at one end in said bearing means and having its opposite end unsupported whereby a hollow core may be fitted onto the mandrel, an axial bore in the mandrel, a plurality of guide openings in the wall of the mandrel, a plurality of jaws mounted in said guide openings, an actuating rod mounted in said bore and having a tapered portion adapted to engage said jaws to move them outwardly into engagement with a piece of work positioned on the mandrel, when the rod is moved in one direction, a tubular member secured at one end to the mandrel and axially aligned therewith, an axially movable tubular member having a telescoping connection with said first mentioned tubular member, said axially movable tubular member being secured to the adjacent end of the actuating rod, a non-rotatable head rotatably supporting the outer end of said axially movable tubular member, a crosshead secured to said head, spaced guides for receiving the ends of the crosshead, and a pivoted operating lever having one end pivotally connected to the crosshead, whereby when the operating lever is oscillated, the axially movable telescoping member is operated to axially move the actuating rod within the mandrel, thereby to expand or contract the jaws.

PAUL P. ELKA.